United States Patent
Horiuchi et al.

(10) Patent No.: US 10,029,537 B2
(45) Date of Patent: Jul. 24, 2018

(54) CABIN ENVIRONMENT CONTROL SYSTEM, CABIN ENVIRONMENT CONTROL METHOD, AND CABIN ENVIRONMENT CONTROL PROGRAM

(71) Applicant: AISIN AW CO., LTD., Anjo-shi, Aichi-ken (JP)

(72) Inventors: Ayano Horiuchi, Suzuka (JP); Tomoki Kubota, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 238 days.

(21) Appl. No.: 15/026,184

(22) PCT Filed: Oct. 20, 2014

(86) PCT No.: PCT/JP2014/077829
§ 371 (c)(1),
(2) Date: Mar. 30, 2016

(87) PCT Pub. No.: WO2015/060244
PCT Pub. Date: Apr. 30, 2015

(65) Prior Publication Data
US 2016/0229264 A1    Aug. 11, 2016

(30) Foreign Application Priority Data

Oct. 23, 2013    (JP) .................... 2013-220033

(51) Int. Cl.
*B60H 1/00* (2006.01)
*B60H 1/34* (2006.01)

(52) U.S. Cl.
CPC ..... *B60H 1/00657* (2013.01); *B60H 1/00028* (2013.01); *B60H 1/00842* (2013.01); *B60H 1/00985* (2013.01); *B60H 1/34* (2013.01); *B60K 2350/1028* (2013.01)

(58) Field of Classification Search
CPC ................... F24F 11/00–11/89; F24F 2011/0002–2011/0006; B60H 1/00657; B60H 1/00028; B60H 1/34; B60H 1/00985; B60H 1/00842; B60K 2350/1028

See application file for complete search history.

(56) References Cited

U.S. PATENT DOCUMENTS

2015/0061841 A1* 3/2015 Lee .............. G08C 17/02
340/12.5

FOREIGN PATENT DOCUMENTS

| JP | H10-217743 A | 8/1998 |
| JP | 2003-146055 A | 5/2003 |
| JP | 2004-276731 A | 10/2004 |
| JP | 2006-137216 A | 6/2006 |
| JP | 2013-076493 A | 4/2013 |

* cited by examiner

*Primary Examiner* — Adam R Mott
(74) *Attorney, Agent, or Firm* — Oliff PLC

(57) ABSTRACT

Cabin environment control systems, methods, and programs display, on a touch panel display, a cabin image showing positions of an air outlet of an air conditioner and a window in a cabin. The systems, methods, and programs receive a touch input on the cabin image displayed on the touch panel display and control an airflow direction in the cabin based on a relationship between a track of the touch input and the positions of the air outlet of the air conditioner and the window.

8 Claims, 5 Drawing Sheets

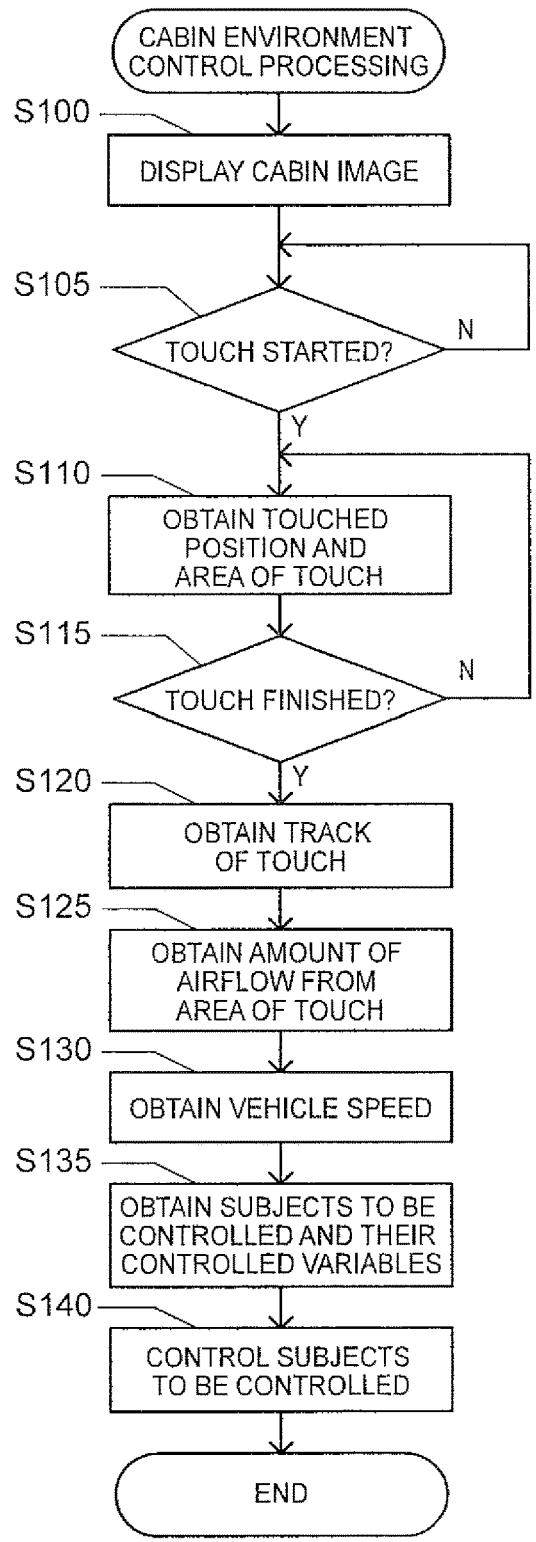

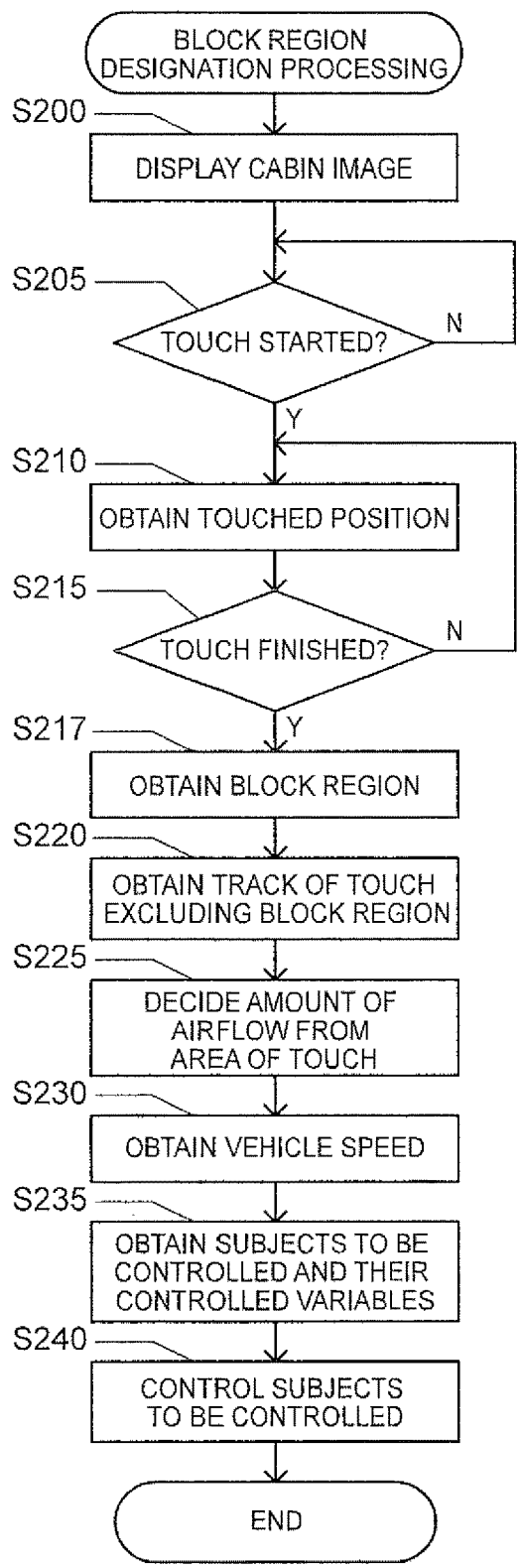

CABIN ENVIRONMENT CONTROL SYSTEM, CABIN ENVIRONMENT CONTROL METHOD, AND CABIN ENVIRONMENT CONTROL PROGRAM

TECHNICAL FIELD

Related technical fields include cabin environment control systems, methods, and programs for controlling an environment in a cabin.

BACKGROUND ART

Conventionally, various techniques are developed in order to help improve an environment in a cabin by using an air conditioner etc. For example, Japanese Patent Application Publication No. 2004-276731 (JP 2004-276731 A) discloses a technique of displaying animation of three-dimensional airflow to show how air is blown. Japanese Patent Application Publication No. 2003-146055 (JP 2003-146055 A) discloses a technique of displaying temperature distribution in a cabin.

SUMMARY

In the conventional techniques, it is difficult to control the airflow direction in the cabin as intended. Although the use of the conventional techniques can help improve an environment in a cabin, the conventional techniques do not provide any guidelines on how to control the airflow direction in the cabin as intended. The user therefore needs to actually adjust an air conditioner etc. in order to adjust the airflow direction in the cabin as intended.

Exemplary embodiments of the brad inventive principles described herein address the above problem, and it is an object of exemplary embodiments to provide a technique of controlling an environment in a cabin as intended by the user by a simple operation.

Exemplary embodiments provide a cabin environment control systems, methods, and programs that display, on a touch panel display, a cabin image showing positions of an air outlet of an air conditioner and a window in a cabin. The systems, methods, and programs receive a touch input on the cabin image displayed on the touch panel display and control an airflow direction in the cabin based on a relationship between a track of the touch input and the positions of the air outlet of the air conditioner and the window.

As described above, the cabin environment control systems, methods, and programs control the airflow direction so as to achieve an airflow direction that has been input by the track of touch on the touch panel display. Namely, by moving a finger etc. while touching the touch panel display with the finger, the user can input a track of the movement of the finger. A continuous change in position can be easily defined by this track. Accordingly, in the configuration in which the cabin image is displayed on the touch panel display and the airflow direction is input by the track, a continuous change in position of the airflow direction in the cabin can be easily input. By controlling the airflow direction such that the input airflow direction is achieved, the environment in the cabin can be controlled as intended by the user by a simple operation.

BRIEF DESCRIPTION OF THE DRAWINGS

FIG. 2 is a flowchart of a cabin environment control processing.

FIG. 4 is a flowchart of a block region designation processing.

DETAILED DESCRIPTION OF EXEMPLARY EMBODIMENTS

Figure 1:
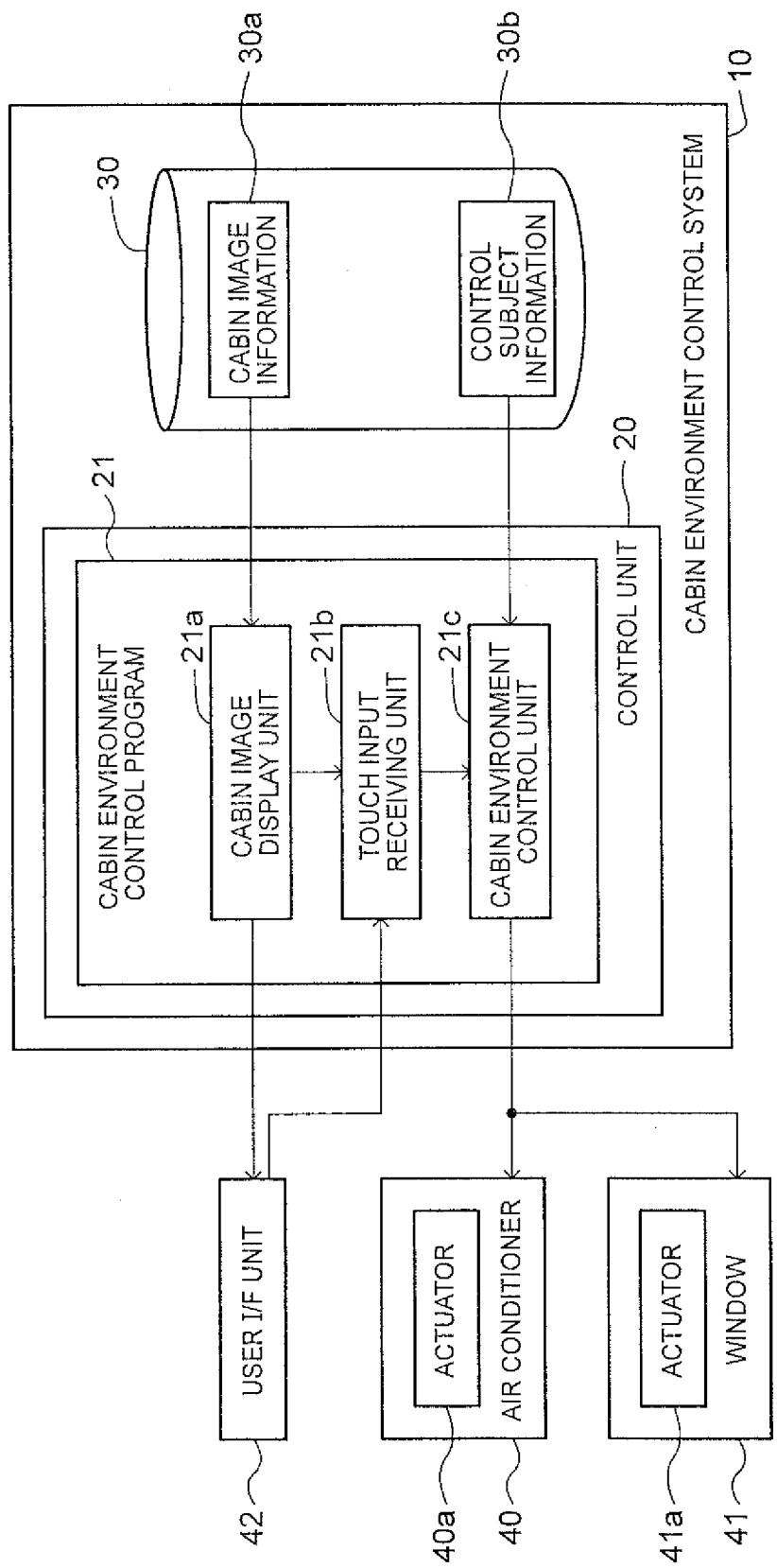
FIG. 1 is a block diagram of a cabin environment control system.

Embodiments will be described in the following order.
(1) Configuration of Navigation System:
(2) Cabin Environment Control Processing:
(2-1) Blocking of Airflow in Designated Region:
(3) Other Embodiments:
(1) Configuration of Navigation System FIG. 1 is a block diagram showing the configuration of a cabin environment control system 10. In the present embodiment, the cabin environment control system 10 includes a control unit 20 including a CPU, a RAM, a ROM, etc. and a recording medium 30 and is used in a cabin. (As used herein the term "recording medium" is not intended to encompass transitory signals.) The cabin environment control system 10 can execute programs stored in the recording medium 30 or the ROM by the control unit 20. In the present embodiment, the control unit 20 can execute a cabin environment control program 21 as one of the programs. The control unit 20 may be able to execute other programs such as a control program for audio equipment or a navigation program.

A vehicle using the cabin environment control system 10 includes a plurality of air conditioners 40, a plurality of windows 41, and a user I/F unit 42. Each air conditioner 40 has attached thereto fins for changing the air discharge direction in the up-down direction (vertical direction) and fins for changing the air discharge direction in the left-right direction (horizontal direction). In the present embodiment, the air conditioner 40 includes an actuator 40a for adjusting the angle of the fins for changing the air discharge direction in the left-right direction. The control unit 20 can change the air discharge direction of the air conditioner in the left-right direction by outputting a control signal to the actuator 40a to drive the actuator 40a. The control unit 20 can also change the amount of airflow from the air conditioner 40 by outputting a control signal to the air conditioner 40.

The window 41 includes an actuator 41a for opening and closing the window. The control unit 20 can change the amount by which the window 41 is opened or closed by outputting a control signal to the actuator 41a to drive the actuator 41a. The user I/F unit 42 is an interface unit for receiving a command from the user and providing the user with various kinds of information. The user I/F unit 42 includes a display unit that is formed by a touch panel display, not shown, and that also serves as an input unit, and an output unit that outputs sound such as a speaker.

Figure 3A:
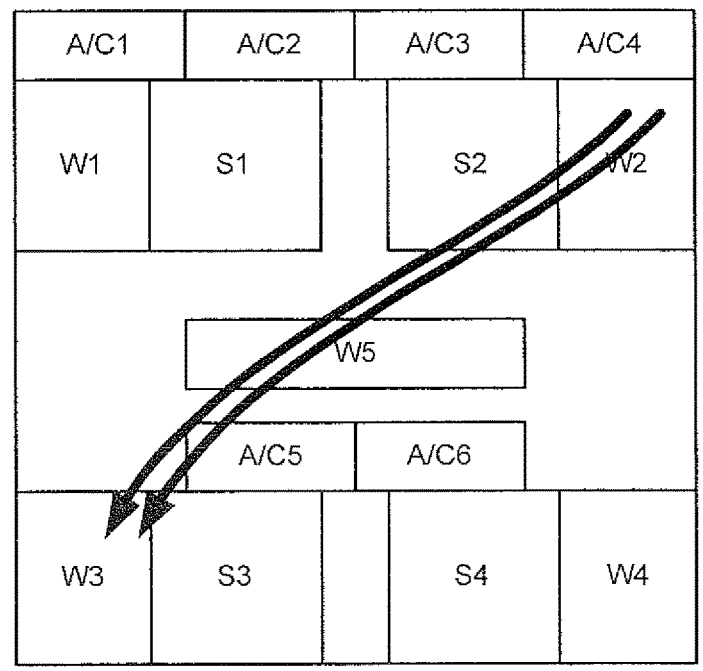
FIG. 3A is a diagram showing a track of touch that is input on a cabin image.

Cabin image information 30a and control subject information 30b are recorded in advance in the recording medium 30. The cabin image information 30a is image data that is used to display a schematic view of the cabin of the vehicle on the display unit. In the present embodiment, the cabin image information 30a is data that is used to display such a schematic view of the cabin as shown in FIG. 3A on the display unit. Namely, the present embodiment uses a configuration in which an image schematically showing the positions of air outlets of the air conditioners 40, the windows 41, and seats by rectangles is displayed. In FIG. 3A, reference characters A/C1 to A/C6 denote the air conditioners 40, reference characters W1 to W5 denote the windows 41, and reference characters S1 to S4 denote the seats. S1 denotes the left front seat (passenger's seat), S2 denotes the right front seat (driver's seat), S3 denotes the left rear seat, and S4 denotes the right rear seat. A/C1 to A/C4 denote the air conditioners 40 attached to an instrument panel in the front part of the vehicle. A/C1 to A/C4 sequentially denote the air conditioners 40 from left to right. A/C5 denotes the air conditioner 40 located on the left side in front of the rear seats, and A/C6 denotes the air conditioner 40 located on the right side in front of the rear seats. W1 denotes the left front window, W2 denotes the right front window, W3 denotes the left rear window, W4 denotes the right rear window 41, and W5 denotes the window 41 (sunroof) in the ceiling of the cabin.

The control subject information 30b is information that associates a track of touch with subjects to be controlled. The present embodiment uses a configuration in which the airflow direction and the amount of airflow are designated by performing an operation of moving a finger while touching the cabin image displayed on the touch panel display described below with the finger (this configuration will be described later in detail). The control subject information 30b contains a plurality of typical examples of the track of touch. The air conditioner 40 and the window 41 to be controlled and their controlled variables (the air discharge direction, the air discharge amount, and the amount by which the window is opened or closed) are associated with each typical example of the track of touch. The subjects to be controlled and their controlled variables, which are associated with each typical example of the track of touch, are decided in advance based on the relationship between the track of touch and the positions of the air outlets of the air conditioners 40 and the windows 41. In order to define the control subject information 30b, the positions of the air outlets of the air conditioners 40 and the windows 41 in the vehicle using the cabin environment control system 10 are specified in advance. Moreover, candidates of the positions of the air outlet of the air conditioner 40 and the window 41 which can achieve the airflow direction matching with or similar to a typical track of touch are provided (a plurality of candidates are provided, and a single candidate may include the air outlets of a plurality of air conditioners 40 and a plurality of windows 41). For each candidate, various air discharge directions and various air discharge amounts from the air outlet of the air conditioner 40 and various amounts by which 41 is opened or closed are tried, and the airflow direction closest to the typical track of touch is selected. In this state, controlled variables for the air outlet of the air conditioner 40 and the window 41 which achieve the selected airflow direction are specified and associated with the typical track of touch. In the present embodiment, the control subject information 30b is defined by carrying out such a trial for a plurality of tracks of touch and associating the air conditioner 40 and the window 41 as the subjects to be controlled and their controlled variables with each of the plurality of tracks of contract. Accordingly, by specifying a typical example closest to a track of touch from the control subject information 30b, the control unit 20 can obtain the airflow direction between the start point and the end point of the continuous track of touch and control the air conditioner and the window such that the airflow direction according to the track of touch is achieved. Namely, once the control unit 20 selects the subjects to be controlled and their controlled variables according to a track of touch based on the control subject information 30b, the control unit 20 can substantially control the airflow direction based on the relationship between the track of touch and the positions of the air outlets of the air conditioners and the windows.

In the present embodiment, the airflow direction is defined such that the start point of a typical example of the track of touch is on the windward side and the end point thereof is on the leeward side. That is, in the present embodiment, the airflow direction for every typical track is defined as the airflow direction from the start point toward the end point of the track such that a tangent to the track from the start point to the end point corresponds to the airflow direction. In the control subject information 30b, the controlled variable (command value for the actuators 40a, 41a) of at least one of the air conditioners 40 and the windows 41 is defined such that the airflow direction from the start point to the end point of a typical example of the continuous track of touch is parallel to the track of touch.

Specifically, a source of airflow located on the windward side, a source of airflow located at an intermediate position in a track of touch, and an air outlet located on the leeward side are the subjects to be controlled. The subjects to be controlled are defined in advance such that the airflow direction is achieved, and the controlled variable is defined for each subject to be controlled. As a result, by specifying a typical example closest to a track of touch from the control subject information 30b, the control unit 20 can specify the airflow direction such that the airflow direction in the cabin is parallel or close to parallel to the track of touch.

The amount of airflow is also defined in the control subject information 30b. In the present embodiment, the amount of airflow is specified by the area of touch on the touch panel display, and the amount of airflow is changed stepwise by the number of fingers touching the touch panel display. Specifically, one finger, two fingers, and three fingers correspond to a small amount of airflow, a medium amount of airflow, and a large amount of airflow, respectively. The small amount of airflow, the medium amount of airflow, and the large amount of airflow can be defined by, e.g., specifying three ranges of the amount of airflow by the speed of airflow etc.

In the control subject information 30b, the controlled variables of the subjects to be controlled for the small, medium, and large amounts of airflow are defined for every vehicle speed. Specifically, in the control subject information 30b, the air discharge amounts of the air conditioner 40 for the small, medium, and large amounts of airflow are defined for every vehicle speed for the case where the subjects to be controlled include the air conditioner 40. The amounts by which the window 41 is opened or closed for the small, medium, and large amounts of airflow are defined for every vehicle speed for the case where the subjects to be controlled include the window 41.

Typically, when the window 41 is open, the more the window 41 is open, the larger the amount of airflow is, and the amount of air flowing into or out of the cabin through the window 41 can vary depending on the vehicle speed. In the present embodiment, the amounts by which the window 41 is opened or closed and the air discharge amounts of the air conditioner 40 for the small, medium, and large amounts of airflow are specified in advance for every vehicle speed for the case where the subjects to be controlled include the window 41, and are defined as the control subject information 30b. Accordingly, the control unit 20 can specify the controlled variable (the air discharge amount or the amount by which the window is opened or closed) for each subject to be controlled by specifying the amount of airflow based on the area of touch, specifying the vehicle speed, and referring to the control subject information 30b.

The cabin environment control program 21 allows the control unit 20 to implement a function to receive the airflow direction and the amount of airflow in response to a touch on a cabin image displayed on the touch panel display of the user I/F unit 42. The cabin environment control program 21 thus includes a cabin image display unit 21a, a touch input receiving unit 21b, and a cabin environment control unit 21c. The cabin image display unit 21a is a program module that allows the control unit 20 to implement a function to display on the touch panel display a cabin image showing the cabin. By the processing of the cabin image display unit 21a, the control unit 20 refers to the cabin image information 30a and outputs to the user I/F unit 42 a control signal for displaying a cabin image at a predetermined position. As a result, such a cabin image as shown in FIG. 3A is displayed at the predetermined position on the touch panel display of the user I/F unit 42.

The touch input receiving unit 21b is a program module that allows the control unit 20 to implement a function to receive a touch input on the cabin image displayed on the touch panel display. In response to a touch on the touch panel display, the user I/F unit 42 outputs a signal indicating the touched position. The control unit 20 specifies the touched position on the cabin image based on the signal.

The cabin environment control unit 21c is a program module that allows the control unit 20 to implement a function to control the airflow direction and the amount of airflow in the cabin according to the track of touch on the touch panel display. That is, in the case where the touched position on the touch panel display received by the processing of the touch input receiving unit 21b changes continuously, the control unit 20 specifies a track of touch by specifying the touched positions from the start point to the end point of the touch. The continuous change in position can thus be easily specified by using the touch on the touch panel display. Accordingly, with the configuration in which the cabin image is displayed on the touch panel display and the airflow direction is input by the track, a continuous change in position of the airflow direction in the cabin can be easily input.

The control unit 20 regards the airflow direction at each position of the track as being shown by the track and controls the airflow direction in the cabin such that the airflow direction at each position matches with or is similar to the track. Specifically, the control unit 20 specifies the subjects to be controlled (the air conditioner 40 or the window 41) by referring to the control subject information 30b and specifying from the control subject information 30b a typical example that is the most similar to the track of touch. The control unit 20 thus controls the airflow direction based on the relationship between the track of touch and the positions of the air outlets of the air conditioners and the windows.

By the processing of the cabin environment control unit 21c, the control unit 20 also obtains the amount of airflow in the cabin based on the area of touch on the touch panel display. That is, the touched position on the touch panel display usually is not a single point but extends over a range having a predetermined area. The control unit 20 therefore determines if the touch panel display is touched by one, two, or three fingers by specifying the range in which the touched position on the touch panel display received by the processing of the touch input receiving unit 21b is present and comparing the area of the specified range with two thresholds. The control unit 20 determines that the amount of airflow is small in the case where the touch panel display is touched by one finger, determines that the amount of airflow is medium in the case where the touch panel display is touched by two fingers, and determines that the amount of airflow is large in the case where the touch panel display is touched by three fingers. The control unit 20 refers to the control subject information 30b and specifies, according to the specified amount of airflow, the controlled variable (the air discharge amount or the amount by which the window is opened or closed) of each subject to be controlled.

Once the subject to be controlled and its controlled variable are thus specified, the control unit 20 outputs a control signal to the subject to be controlled to control the subject such that the specified controlled variable is achieved. That is, the control unit 20 outputs a control signal to the actuator 40a in the case of controlling the airflow direction by the air conditioner 40. The control unit 20 outputs a control signal to the air conditioner 40 in the case of controlling the amount of airflow by the air conditioner 40. The control unit 20 outputs a control signal to the actuator 41a in the case of controlling the airflow direction or the amount of airflow by the window 41.

As described above, in the present embodiment, the control unit 20 specifies the airflow direction according to the track of touch on the touch panel display of the user I/F unit 42, and controls the airflow direction to the specified airflow direction. The environment in the cabin can thus be controlled as intended by the user by a simple operation. The control unit 20 also specifies the amount of airflow according to the touch on the touch panel display. The amount of airflow can thus be specified by a simple input. Since the control unit 20 obtains the amount of airflow in the cabin according to the area of touch on the touch panel display, the control unit 20 can obtain the airflow direction and the amount of airflow at the same time. The environment in the cabin can therefore be set by a very simple input.

(2) Cabin Environment Control Processing

A cabin environment control processing that is executed by the cabin environment control program 21 will be described in detail below. FIG. 2 is a flowchart of the cabin environment control processing. In the present embodiment, the cabin environment control processing is executed when the user sends a command to start executing the cabin environment control processing through the user I/F unit 42. In the cabin environment control processing, the control unit 20 displays a cabin image by the processing of the cabin image display unit 21a (step S100). Namely, the control unit 20 refers to the cabin image information 30a and outputs a control signal for displaying the cabin image at a predetermined position to the user I/F unit 42 such that the cabin image as shown in FIG. 3A is displayed at the predetermined position on the touch panel display of the user I/F unit 42.

Next, the control unit 20 waits until it is determined by the processing of the touch input receiving unit 21b that a touch on the cabin image displayed on the touch panel display has been started (step S105). That is, the control unit 20 waits until it receives a signal indicating the touched position on the touch panel display, namely a signal indicating the position overlapping the display position of the cabin image, from the user I/F unit 42.

If it is determined in step S105 that a touch on the cabin image displayed on the touch panel display has been started, the control unit 20 obtains the touched position and the area of touch on the touch panel display based on the output signal from the user I/F unit 42 by the processing of the touch input receiving unit 21*b* (step S110).

The control unit 20 then determines whether the touch on the cabin image displayed on the touch panel display has been finished or not by the processing of the touch input receiving unit 21*b* (step S115). That is, the control unit 20 determines if the user I/F unit 42 is no longer outputting the signal indicating the touched position on the touch panel display. The control unit 20 repeats the processing of step S110 and the subsequent steps until it is determined in step S115 that the touch on the cabin image displayed on the touch panel display has been finished.

FIG. 3A shows an input example of the track of touch in steps S105 to S115. In FIG. 3A, the track of touch is shown by solid arrows. FIG. 3A shows an example in which a curve from the window W2 as a start point to the window W3 has been input as a track indicating the airflow direction. In FIG. 3A, two arrows mean that the track of touch has been input by two fingers.

If it is determined in step S115 that the touch on the cabin image displayed on the touch panel display has been finished, the control unit 20 obtains the track of touch by the processing of the cabin environment control unit 21*c* (step S120). Namely, the control unit 20 obtains a plurality of touched positions between the start point and the end point of the touch obtained in steps S105 to S115 as a track of touch.

The control unit 20 then obtains the amount of airflow from the area of touch by the processing of the cabin environment control unit 21*c* (step S125). Namely, the control unit 20 obtains the area of touch by specifying the range on which each touched position obtained in steps S105 to S115 is present, and compares the obtained area of touch with the two thresholds to determine if the amount of airflow is small, medium, or large.

The control unit 20 then obtains the vehicle speed by the processing of the cabin environment control unit 21*c* (step S130). Namely, the control unit 20 specifies the past average speed of the vehicle based on the traveling history of the vehicle, not shown, recorded on the recording medium 30 and obtains the specified past average speed as the vehicle speed. Various other methods may be used to obtain the vehicle speed. For example, the control unit 20 may obtain an estimated average vehicle speed on a route the vehicle is supposed to take.

Thereafter, the control unit 20 obtains the subjects to be controlled and their controlled variables by the processing of the cabin environment control unit 21*c* (step S135). Namely, the control unit 20 refers to the control subject information 30*b* to obtain a typical example that is the most similar to the track of touch obtained in step S120. For example, the control unit 20 can obtain a typical example of a track that is the most similar to the track of touch by processing of specifying a curve showing the track of touch obtained in step S120, obtaining the distance between the curve and each typical example in the control subject information 30*b* for each of a plurality of positions, and selecting the typical example of a track having the smallest total of the distances as a typical example of a track that is the most similar to the track of touch, etc. Once the typical example of a track that is the most similar to the track of touch is specified, the control unit 20 specifies the subjects to be controlled (at least one of the air conditioners 40 and the windows 41) which is associated with the typical example, based on the control subject information 30*b*. The control unit 20 also obtains the controlled variable of each subject to be controlled, which achieves the amount of airflow obtained in the step S125, from the control subject information 30*b* associated with the vehicle speed obtained in step S130.

The control unit 20 controls the subjects to be controlled by the processing of the cabin environment control unit 21*c* (step S140). That is, the control unit 20 outputs a control signal to at least one of the air conditioners 40, the actuators 40*a*, and the actuators 41*a* to drive the subjects obtained in step S135 with the controlled variables obtained in step S135.

Figure 3B:
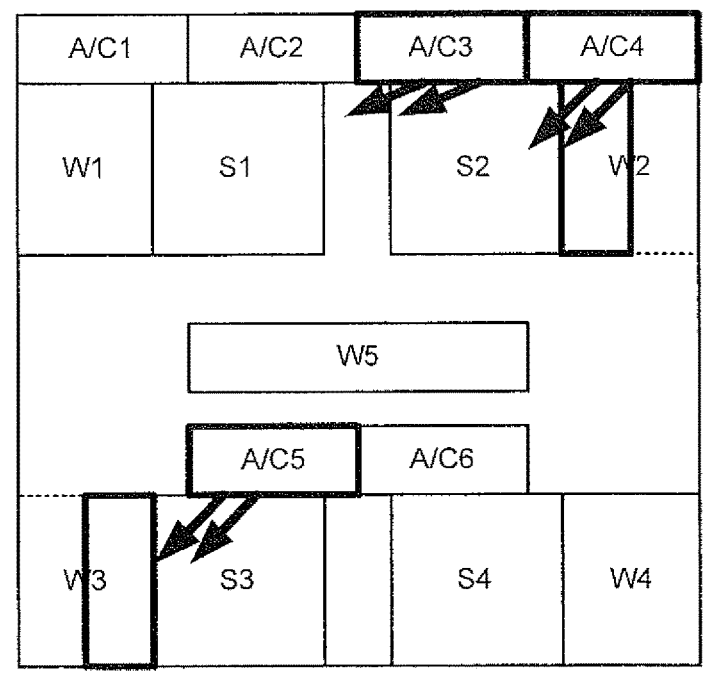
FIG. 3B is a diagram showing an example in which subjects to be controlled are controlled according to the track of touch.

FIG. 3B is a diagram showing a control example in the case where the airflow direction and the amount of airflow shown in FIG. 3A have been specified. In the track of touch shown in FIG. 3A, the start point is the window W2, and the end point thereof is the window W3. This track of touch passes through the middle part of the cabin. In the present embodiment, the airflow direction is defined such that the start point of the track of touch is on the windward side and the end point thereof is on the leeward side. A source of airflow located on the windward side, a source of airflow located at an intermediate position in the track, and an air outlet located on the leeward side are the subjects to be controlled. In the example of FIG. 3A, the air conditioners A/C3, A/C4 as sources of airflow located around the window W2 on the windward side, the window W2, the air conditioner A/C5 as a source of airflow located at the intermediate position in the track, and the window W3 as an air outlet located on the leeward side are the subjects to be controlled. The subjects to be controlled are shown by thick lines in FIG. 3B.

For each of the air conditioners A/C3, A/C4, A/C5 as the sources of airflow, the controlled variable for each vehicle speed has been decided in the control subject information 30*b* such that the airflow direction near the track of touch is parallel to the track. For each of the windows W2, W3, the amount by which the window is opened or closed has been decided in the control subject information 30*b* so that air flows into the cabin through the window W2 and flows out of the cabin through the window W3. Accordingly, the control unit 20 outputs the controlled variables to control the air conditioners A/C3, A/C4, A/C5 such that air is discharged from the air conditioners A/C3, A/C4, A/C5. The control unit 20 also outputs the controlled variables to control the windows W2, W3 such that the windows W2, W3 are opened and air flows into the cabin through the window W2 and flows out of the cabin through the window W3. In FIG. 3B, the air discharge direction of each air conditioner A/C3, A/C4, A/C5 is shown by arrows, and the amount of airflow of each air conditioner A/C3, A/C4, A/C5 is shown by the number of arrows (two arrows mean the medium amount of airflow). In FIG. 3B, the windows W2, W3 are shown by rectangles smaller than those showing the windows W2, W3 in FIG. 3A, which means that the windows W2, W3 in FIG. 3B are open. The environment in the cabin is thus controlled such that the airflow direction and the amount of airflow which have been specified by the track of touch on the touch panel display of the user I/F unit 42 is achieved.

(2-1) Blocking of Airflow in Designated Region:

Other functions may be added to the configuration in which the airflow direction is specified by the track of touch as described above. For example, the configuration may be added in which the airflow direction can be more specifically specified or in which the airflow direction can be corrected after it is decided. FIG. 4 is a flowchart of a block region designation processing. The block region designation processing is processing that allows airflow to be blocked in a block region, namely a region where airflow is desired to be blocked, after the airflow direction is decided by the cabin environment control processing shown in FIG. 2.

The block region designation processing is executed when the user sends a command to start executing the block region designation processing through the user I/F unit 42 after the processing of FIG. 2. Steps S200 to S215 of the block region designation processing are substantially similar to steps S100 to S115 of the cabin environment control processing. However, the control unit 20 does not need to obtain the area of touch in step S210. In steps S200 to S215, the user does not designate the airflow direction but designates a block region by the track of touch. In this example, the user designates a block region by a closed curve (or by an open curve in which the distance between the start point and the end point is equal to or smaller than a predetermined distance).

Figure 5A:
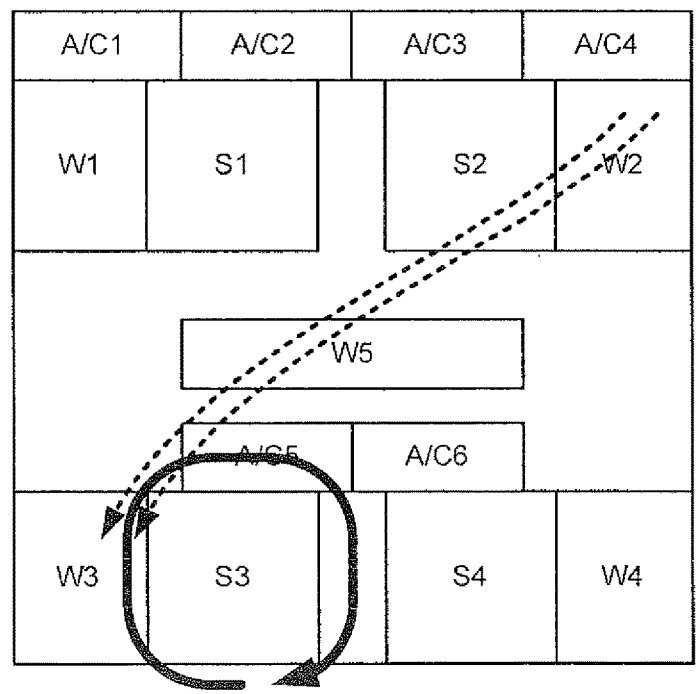
FIG. 5A is a diagram showing a block region that is input on the cabin image.

FIG. 5A shows an input example of the track of touch in steps S205 to S215. In FIG. 5A, the track of touch is shown by a solid arrow. FIG. 5A shows an example in which the left rear seat S3 has been designated as a block region. In FIG. 5A, the airflow direction that has been input in FIG. 3A is shown by dashed arrows. In this airflow direction, the left rear seat S3 is located near the path of airflow. Accordingly, air may blow on the user seated on the left rear seat S3. If the user wishes to restrain air from blowing on him/her, the left rear seat S3 is designated as a block region.

Steps S200 to S215 are performed. If it is determined in step S215 that a touch on the cabin image on the touch panel display has been finished, the control unit 20 obtains a block region by the processing of the cabin environment control unit 21c (step S217). Namely, the control unit 20 obtains as a block region a region surrounded by a plurality of touched positions between the start point and the end point of the touch obtained in steps S205 to S215.

The control unit 20 then obtains the track of touch excluding the block region (step S220). Namely, the control unit 20 removes the block region obtained in step S217 form the track of touch obtained in step S120 to obtain a new track. For example, in the case of removing the block region shown by the solid arrow from the track of touch shown by the dashed arrows in FIG. 5A, the control unit 20 obtains a track shown by alternate long and short dashed arrows as a new track.

Steps S225 to S240 are similar to steps S125 to S140. Namely, in the block region designation processing, the control unit 20 specifies a block region in the cabin where airflow should be blocked based on a touch indicating a region. The control unit 20 removes the track included in the block region from the track of touch obtained in step S120, obtains the airflow direction from the start point to the end point of the resultant track, and controls the airflow direction in the cabin.

Figure 5B:
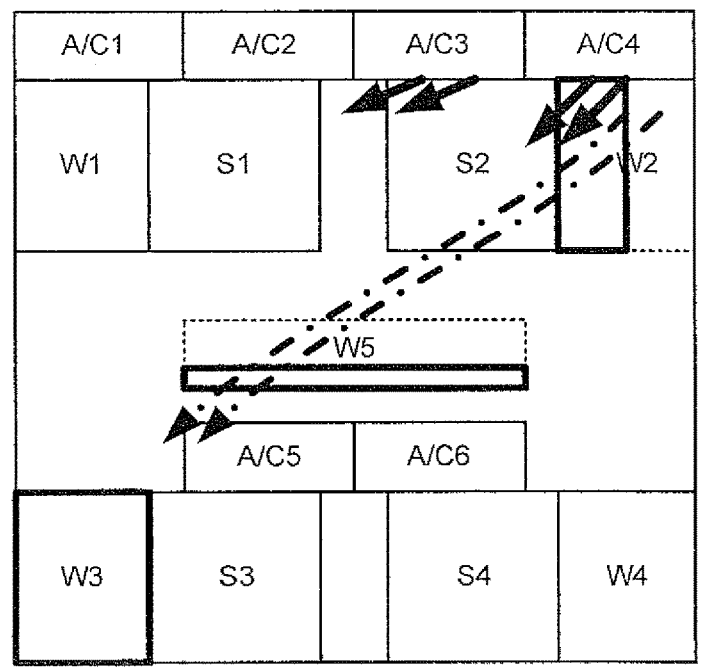
FIG. 5B is a diagram showing an example in which subjects to be controlled are controlled in a case where airflow to the block region is blocked.

In the track of touch of FIG. 5B excluding the block region, the window W2 is the start point and the air conditioner A/C5 is the end point. The airflow direction is therefore defined such that the window W2 is on the windward side and the air conditioner A/C5 is on the leeward side. In this case as well, a source of airflow located on the windward side, a source of airflow located at an intermediate position in the track, and an air outlet located on the leeward side are the subjects to be controlled. In the example shown in FIG. 5B, the air conditioners A/C3, A/C4 as sources of airflow located around the window W2 on the windward side, the window W2, and the window W5 as an air outlet located on the leeward side are the subjects to be controlled.

For each of the air conditioners A/C3, A/C4 as the sources of airflow, the controlled variable for each vehicle speed has been decided in the control subject information 30b such that the airflow direction near the track of touch is parallel to the track. For each of the windows W2, W5, the amount by which the window is opened or closed has been decided in the control subject information 30b such that air flows into the cabin through the window W2 and flows out of the cabin through the window W5. Accordingly, the control unit 20 outputs the controlled variables to control the air conditioners A/C3, A/C4 and the windows W2, W5 such that air is discharged from the air conditioners A/C3, A/C4 and the windows W2, W5 are opened. In the track of touch shown in FIG. 5B, the air conditioner A/C5 and the window W3 are not the subjects to be controlled. Accordingly, the air conditioner A/C5 is stopped, and the window W3 is closed. In FIG. 5B, the air discharge direction of each air conditioner A/C3, A/C4 is shown by arrows, and the amount of airflow of each air conditioner A/C3, A/C4 is shown by the number of arrows (two arrows mean the medium amount of airflow). The windows W2, W5 in FIG. 5B are shown by rectangles smaller than those showing the windows W2, W5 in FIG. 5A, which means that the windows W2, W5 in FIG. 5B are open. The window W3 in FIG. 5B is shown by a rectangle of the same size as that of the rectangle showing the window W3 in FIG. 5A, which means that the window W3 in FIG. 5B is closed. The environment in the cabin is thus controlled such that airflow to the block region is blocked. According to this configuration, if there is an occupant in the cabin who does not want air to blow on him/her, a cabin environment that is comfortable to this occupant can be designated.

(3) Other Embodiments:

The above embodiment is merely an example, and various other embodiments can be used as long as the airflow direction in the cabin is controlled according to the track of touch on the cabin image. For example, the cabin environment control system may be implemented by a computer that is carried by an occupant of the vehicle, etc. The airflow direction may be able to be adjusted not only in the direction on the horizontal plane but also in the up-down direction. In order to facilitate control of the airflow direction, the positions that can be the start point and the end point of the track of touch may be limited to specific portions such as the air conditioners or the windows which are the subjects to be controlled.

The cabin image display means need only be able to display a cabin image showing the cabin on the touch panel display. That is, the cabin image display means need only be able to display a cabin image that serves as an subject to be touched such that the position in the cabin is designated by touching the cabin image on the touch panel display and the airflow direction at each position is designated by the track of touch (a tangent to the line of the track). For example, the cabin image may be formed by a schematic view of the cabin, and the schematic view may be in various forms. The schematic view of the cabin may be either a plan view or a side view of the cabin, or may be both a plan view and a side view of the cabin.

The touch input receiving means need only be able to receive a touch input on the cabin image displayed on the touch panel display. That is, the touch input receiving means need only be able to receive designation of the position in the cabin by a touch on the cabin image displayed on the touch panel display.

The cabin environment control means need only be able to control the airflow direction in the cabin according to the track of touch. That is, the cabin environment control means need only be able to specify the track of touch based on a change in a touched position on the cabin image displayed on the touch panel display, regard the airflow direction at each position of the track as being shown by the track, and control the airflow direction in the cabin such that the airflow direction at each position matches or is similar to the track. The subjects to be controlled in order to control the airflow direction include various devices such as air conditioners and windows. That is, the direction of air discharged from the air conditioner can be adjusted by adjusting the air discharge direction of the air conditioner. The direction of air flowing into or out of the cabin through the window can be adjusted by adjusting the amount by which the window is opened or closed. The windows include various windows in addition to the windows mounted on the doors of the vehicle. For example, the windows may include a window mounted on the roof.

The configuration in which the cabin environment control means obtains the airflow direction from the start point to the end point of the continuous track of touch and controls the airflow direction in the cabin may be used as the configuration for obtaining the airflow direction from the track of touch. Namely, the airflow direction may be defined by the track with a finite length having both the start point and the end point defined. For example, according to this configuration, the airflow direction need only be obtained such that the start point is located on the windward side and the end point is located on the leeward side. The airflow direction can thus be easily specified.

The track from the start point to the end point can be regarded as representing the airflow direction. For example, the cabin environment control means may control at least one of the air discharge direction of the air conditioner and the amount by which the window is opened or closed such that the airflow direction from the start point to the end point of the continuous track of touch is parallel to the track of touch. Namely, the airflow direction around the air outlet of the air conditioner can be controlled by controlling the air discharge direction of the air conditioner, and the airflow direction around the open window can be controlled by controlling the amount by which the window is opened or closed. At least one of the air discharge direction of the air conditioner and the amount by which the window is opened or closed need only be controlled such that the airflow direction from the start point to the end point of the continuous track of touch is parallel to the track of touch. The airflow direction need only be controlled such that the airflow direction in at least a part of the continuous track of touch is parallel to the track of touch. Whether the track is parallel to the airflow direction or not need not be precisely defined, and the airflow direction need only be controlled so as to be parallel or close to parallel to the track.

The cabin environment control means may specify a block region in the cabin where airflow should be blocked based on a touch indicating a region, remove the track included in the block region from the track of touch, obtain the airflow direction from the start point to the end point of the resultant track, and control the airflow direction in the cabin. That is, the configuration in which the block region where air is not allowed to flow is designated may be implemented in addition to the configuration in which the track along which air is caused to flow is designated by a touch. According to this configuration, if there is an occupant in the cabin who does not want air to blow on him/her, a cabin environment that is comfortable to this occupant can be designated.

In the case of removing the track included in the block region from the track of touch and obtaining the airflow direction from the start point to the end point of the resultant track, it is preferable that air not be allowed to flow in the block region located after the end point. In order to implement this, embodiments may use the configuration in which air is directed at the end point in a direction other than the direction toward the block region. For example, a portion to which a lot of air flows (such as a window opened such that air flows out of the cabin therethrough) may be provided at the end point or before the end point (on the start point side). A touch that specifies a block region may be made in various manners. For example, a tapping operation, an operation of designating a region by a track of touch (an operation of tracing a closed curve etc.), etc. may be performed.

Elements other than the airflow direction may be controlled in order to control the environment in the cabin. For example, the cabin environment control means may obtain the amount of airflow in the cabin based on the area of touch. Since the environment in the cabin varies significantly depending on the amount of airflow in addition to the airflow direction, it is preferable that the amount of airflow be able to be controlled in addition to the airflow direction. Embodiments may be configured such that the amount of airflow can be designated by a touch on the touch panel display. The amount of airflow can thus be specified by a simple input. Embodiments may be configured such that the amount of airflow is obtained based on the area of touch. In this case, the airflow direction and the amount of airflow can be obtained at the same time, and the environment in the cabin can be set by a very simple input. For example, the configuration in which the number of fingers that touch the touch panel display at the same time is changed may be used as the configuration for adjusting the area of touch.

Various configurations may be used as the configuration for changing the amount of airflow. For example, the cabin environment control means may control the amount of airflow in the cabin based on at least one of the air discharge amount of the air conditioner, the amount by which the window is opened or closed, and the vehicle speed. That is, the amount of airflow can be easily controlled by controlling the air discharge amount of the air conditioner. Typically, the more the window is open, the larger the amount of airflow is. Accordingly, the amount of airflow may be controlled by the amount by which the window is opened or closed. If the vehicle is traveling at a specific vehicle speed, the higher the vehicle speed is, the larger the amount of air flowing into the cabin through the window is. Accordingly, the amount of airflow may be regarded as varying according to the vehicle speed. The amount of airflow may be obtained based on the combination of the amount by which the window is opened or closed and the vehicle speed.

The technique of controlling the airflow direction in the cabin according to the track of touch on the cabin image is also applicable as a program or a method. The above cabin environment control system, program, and method are implemented in various forms. For example, the above cabin environment control system, program, and method may be implemented as an independent vehicle environment control system or may be implemented by using a part that is common to the parts included in the vehicle. For example, embodiments can provide a navigation system, method, or program including such a cabin environment control system. Embodiments may be modified as appropriate so as to be partially software and partially hardware. Embodiments may be implemented as a recording medium for a program for controlling the cabin environment control system. The recording medium for the software may be a magnetic recording medium or a magneto-optical recording medium. The same applies to any recording medium that will be developed in the future.

The invention claimed is:

1. A cabin environment control system, comprising:
a memory; and
a processor programmed to:
    display, on a touch panel display, a cabin image showing positions of an air outlet of an air conditioner and a window in a cabin;
    receive a touch input on the cabin image displayed on the touch panel display;
    determine a continuous track of the touch input; and
    control an airflow direction in the cabin to match a direction of the determined track by controlling an air discharge direction of the air conditioner and an amount by which the window is opened or closed.

2. The cabin environment control system according to claim 1, wherein the processor is programmed to:
    obtain from the direction of the determined track from a start point to an end point of the determined track.

3. The cabin environment control system according to claim 1, wherein the processor is programmed to:
    obtain an amount of airflow in the cabin based on an area of the touch input.

4. The cabin environment control system according to claim 3, wherein the processor is programmed to:
    control the amount of airflow in the cabin based on at least one of an air discharge amount of the air conditioner, the amount by which the window is opened or closed, and a vehicle speed.

5. A cabin environment control method, comprising:
    displaying, on a touch panel display, a cabin image showing positions of an air outlet of an air conditioner and a window in a cabin;
    receiving a touch input on the cabin image displayed on the touch panel display; and
    determining a continuous track of the touch input; and
    controlling an airflow direction in the cabin to match a direction of the determined track by controlling an air discharge direction of the air conditioner and an amount by which the window is opened or closed.

6. A computer-readable recording medium storing a computer-executable cabin environment control program that causes a computer to perform the following functions:
    displaying, on a touch panel display, a cabin image showing positions of an air outlet of an air conditioner and a window in a cabin;
    receiving a touch input on the cabin image displayed on the touch panel display; and
    determining a continuous track of the touch input; and
    controlling an airflow direction in the cabin to match a direction of the determined track by controlling an air discharge direction of the air conditioner and an amount by which the window is opened or closed.

7. A cabin environment control system, comprising:
a memory; and
a processor programmed to:
    display, on a touch panel display, a cabin image showing positions of an air outlet of an air conditioner and a window in a cabin;
    receive a touch input on the cabin image displayed on the touch panel display;
    determine a continuous track of the touch input;
    modify the determined track based on information including a relationship between the determined track and the positions of the air outlet of the air conditioner and the window; and
    control an airflow direction in the cabin based on the modified track.

8. The cabin environment control system according to claim 7, wherein the processor is programmed to:
    specify a block region in the cabin where airflow should be blocked based on the touch input indicating a region;
    obtain the modified track by removing a part of the determined track included in the block region from the determined track;
    obtain the airflow direction from a start point to an end point of the modified track; and
    control the airflow direction in the cabin based on the obtained airflow direction.

* * * * *